US006782375B2

(12) United States Patent
Abdel-Moneim et al.

(10) Patent No.: US 6,782,375 B2
(45) Date of Patent: Aug. 24, 2004

(54) NEURAL NETWORK BASED DECISION PROCESSOR AND METHOD

(75) Inventors: Eiman Abdel-Moneim, Chicago, IL (US); Anas Osman, Evanston, IL (US); Azhar M. Usman, Skokie, IL (US); Michael T. Mosier, Chicago, IL (US)

(73) Assignee: Providian Bancorp Services, San Francisco, CA (US)

( * ) Notice: Subject to any disclaimer, the term of this patent is extended or adjusted under 35 U.S.C. 154(b) by 541 days.

(21) Appl. No.: 09/761,328

(22) Filed: Jan. 16, 2001

(65) Prior Publication Data

US 2002/0138455 A1 Sep. 26, 2002

(51) Int. Cl.[7] .................................................. G06N 3/06
(52) U.S. Cl. ............................................ 706/46; 706/15
(58) Field of Search ............................. 706/16, 46, 52, 706/15, 26

(56) References Cited

U.S. PATENT DOCUMENTS

| | | | |
|---|---|---|---|
| 5,809,493 A | * | 9/1998 | Ahamed et al. ............... 706/52 |
| 5,845,285 A | | 12/1998 | Klein ......................... 707/101 |
| 6,035,295 A | | 12/1998 | Klein ............................ 707/6 |
| 5,870,724 A | | 2/1999 | Lawlor et al. |
| 5,920,852 A | | 7/1999 | Graupe ......................... 706/26 |
| 5,948,061 A | | 9/1999 | Merriman et al. |
| 6,006,085 A | | 12/1999 | Balachandran |
| 6,009,410 A | | 12/1999 | LeMole et al. |
| 6,014,698 A | | 1/2000 | Griffiths |
| 6,026,369 A | | 2/2000 | Capek |
| 6,035,294 A | | 3/2000 | Fish .............................. 707/2 |
| 6,055,510 A | | 4/2000 | Henrick et al. |
| 6,055,513 A | * | 4/2000 | Katz et al. ..................... 705/25 |
| 6,067,539 A | | 5/2000 | Cohen ........................... 707/2 |
| 6,078,891 A | | 6/2000 | Riordan et al. |
| 6,085,229 A | | 7/2000 | Newman et al. |
| 6,101,479 A | * | 8/2000 | Shaw ............................. 705/8 |
| 6,141,010 A | | 10/2000 | Hoyle | |

OTHER PUBLICATIONS

"Systems Fail te IQ Test," *Computer Weekly*, Jan. 23, 1997, pp. 36–37.

Steven M. Epstein, "AI and Matters of Clinical and Financial Life or Death," *Health Management Technology*, Jun. 1997, p. 66.

"Equipment Leasing Today," *Bell & Howell Information and Learning Company*, Jan. 1, 2000.

"New B2B Ecommerce Venture to Dramatically Reduce HP, Leasing and Rental Costs for Business Borrowers and Lenders; Whatrate.com Signs Up five Lenders for Beta Tria," *MT Presswire*, Feb. 24, 2000.

"3Re.com Announces Scalable Financing Options Through Ecredit.com," *Business Wire*, Mar. 6, 2000.

"FinanciaLinx First in Canada to Offer Car Dealers Complete Online Financing Solutions," *Canada Newswire*, Apr. 6, 2000.

"UPS Capital Forms Strategic Alliance For Total On–Line Billing Payment Solution," *PR Newswire*, Apr. 26, 2000.

Lynda Jackson, "E–Business: Leasing'S Future . . . Or a Passing Fad?" *Equipment Financing Journal*, May/Jun. 2000, pp. 10–11, 13.

Nicholas Whittemore, "E–Commerce Solutions in the Emerging Leasing E–Scape," *Equipment Financing Journal*, May/Jun. 2000, pp. 5–7.

(List continued on next page.)

Primary Examiner—Wilbert L. Starks, Jr.
(74) Attorney, Agent, or Firm—Stallman & Pollock LLP

(57) ABSTRACT

A computer network-based customer acquisition server and method of selecting preferred products includes using a neural network-based decision engine that automatically generate queries and select preferred products as a function of responses to the queries.

51 Claims, 3 Drawing Sheets

OTHER PUBLICATIONS

"Take Asset–Backed Financing on the Web," *ABA Banking Journal*, May 1, 2000.

Press Release: "Keycorp Provides Online Leasing Services," May 8, 2000.

Press Release: "Calico eBusienss Application Suite to Deliver Comprehensive Equipment Financial Service Online for GE Capital," May 9, 2000.

Press Release: "Business Rush to Online Asset Finance Source; Whatrate Clocks–Up GBP5.1 Million of Asset Financing Requests in First 2 Weeks SInce Launch," May 11, 2000.

"VenServ Selects eCredit.com Global Financing Network to Accelerate Credit Process," *Business Wire*, May 16, 2000.

"FleetBoston Financial to Integrate Biztro Business Operations Platform into Small Business Offering," *Business Wire*, Jun. 5, 2000.

Lawrence J. Pelka, "Commercial E–Business Comes of Age," *Monitor*, Jul./Aug. 2000, pp. 55–56.

Aziz Kahn, "True Global E–Commerce Business Platforms," *Monitor*, Jul./Aug. 2000, pp. 36, 39.

Irving H. Rothman, "A Quest for E–Finance Leadership," *Monitor*, Jul./Aug. 2000, pp. 53–54.

Rachel Litner, "E–Commerce & Equipment Leasing: What Does the Future Hold?" *Monitor*, Jul./Aug. 2000, pp. 3–4, 6–7, 61.

Press Release: "LeaseForum takes Commercial Equipment Leasing Online. Bringing the Power of the Internet to the Business of Leasing ," Jul. 12, 2000.

"Industry Leaders Line Up Behind Medical Industry Marketplace; 117 Distributors and 4 Partners Select Veranto," *PR Newswire*, Jul. 17, 2000.

"eLease Closes a Missing Link in eCommerce With Solution to Add Leasing to Any Web Site," *Business Wire*, Jul. 21, 2000.

Press Release: "eLease Develops the Capital Equipment Leasing Industry's First Standardized Platform for Lease Process Automation," Jul. 21, 2000.

"Mellon Leasing Announces Strategic Alliance With Demandline.com to Increase Participation in Small Business Market," *PR Newswire*, Aug. 3, 2000.

"Finlease Offers an Ecommerce Fix," *World Reporter*, Aug. 11, 2000.

"Dealerscope Consumer Electronics Marketplace," *Bell & Howell Information and Learning Company*, Sep. 1, 2000.

"GlobalTechwatch Unibanco's B–to–B Play," *Bank Technology News*, Sep. 5, 2000.

"eFORCE and Genient Team Up to Deploy Europe's First Virtual Office for Small–to Medium Enterprises," *PR Newswire*, Sep. 14, 2000.

"Global eBusiness Integrator Accelerates Business–to–Busienss Solution Deployment in Europe," *PR Newswire*, Sep. 14, 2000.

Jay Fudemberg, "E–Finance Marketplace, It's About Delivering Value," *Monitor*, Fall 2000, pp. 65, 67.

Kevin Newcomb, "AccessLease Launches Private–Label Online Leasing Solution," Oct. 9, 2000.

Press Release: "eLease Announces that CapitalWerks, LLC Has Chosen the eLease Plateform to Automate Its Entire Leasing and Financing Process," Oct. 19, 2000.

"Siemens Financial Services, Inc. and CapitalStream Team Up to Take Financing Initiatives Online," PR Newswire,, Nov. 13, 2000.

"CapitalStream and Marlin Leasing Team to Offer Online Lease Transactions," *PR Newswire*, Nov. 20, 2000.

Caroline Wilson, "Portals: Competing for Your Bank's Custormers?" *America's Community Banker*Dec. 1, 2000.

"Cotelligent Builds Innovative eCRM Application for BMW," *Interntet Wire*, Dec. 4, 2000.

"Gerber Scientific Signs On to Use eMarket Capital's Equipment Leasing Service; New Internet–Linked Leasing Intermediary Off to a Fast Start," *Business Wire*, Dec. 4, 2000.

"Barco Inc. to Offer eMarket Capital's Equipment Leasing Service to Customers," *PR Newswire*, Dec. 12, 2000.

"AARO Broadband Wireless to Develop Government Leasing Site; E–Commerce Will Create Procurement System of Tomorrow," *Business Wire*, Dec. 14, 2000.

* cited by examiner

NEURAL NETWORK BASED DECISION PROCESSOR AND METHOD

RELATED APPLICATIONS

The following commonly-assigned co-pending application is related to the present application by subject matter and is incorporated herein by reference to provide further background information regarding the present invention: application Ser. No. 09/761,461, filed Jan. 16, 2001, titled "Pay-For-Results-Based Marketing."

BACKGROUND OF THE INVENTION

Advertising and direct marketing have traditionally been used to acquire new customers for various products and services. Recently, Internet-based advertising and marketing have become common. Internet-based advertising typically charges a vendor a fee for each thousand users who view the advertising banner. Such fees are called cost-per-thousand (CPM) fees. If the prospective customer selects the banner advertisement, the prospective customer is commonly directed to the vendor's Internet site or is presented with additional advertisements, coupons, or information. The hosting Internet site may randomly present a variety of banners to the various users or the hosting Internet site may rotate through the banners. Typically, less than 0.2% of the users of the site hosting the banner will select the banner. The vendor may also pay the Internet site hosting the banner a periodic fee or a per-click fee.

Companies, such as ValueClick, Inc., provide a performance-based advertising on a cost-per-click (CPC) basis. Subscribers to ValueClick pay as a function of the number of times their banner advertisements are clicked on. For example, a vendor may pay the site hosting the banner $0.12 to $0.15 each time a user selects the banner.

Internet-based direct marketing allows a computer user to choose to receive marketing information for a particular vendor or for a particular subject matter. For example, a user may be asked if he wishes to receive marketing from a vendor when the computer user sign-up for an account at the vendor's Internet site. Advertisements can be directed to users from a specific country or targeted to specific markets, such as automotive, business and finance, careers, consumer technology, E-community and portals, entertainment and media, family and lifestyles, games, health and fitness, MIS and IT, news and culture, E-commerce and shopping, sports and recreation, travel, and youth and students.

Traditional Internet advertisements and direct marketing are relatively costly on a per actual customer basis. A vendor may spend $400 to $700 in advertising and marketing fees for each customer the vendor actually receives as a result of traditional Internet advertisements and direct marketing. The cost of acquiring a customer via online advertising and marketing is approximately twice the cost of more traditional advertising. Vendors are estimated to have spent $182 billion on advertising and $350 billion on direct marketing in 2000. An estimated $7 billion will be spent by vendors on Internet advertising in 2000, increasing to $25 billion by 2004.

Internet-based portals and search engines, such as Lycos and Yahoo!, provide the capability to search for a product with specific features and to connect with retailers of the products. Such portals and search engines provide search services free of charge to the user and receive revenue from banner advertisements. Manufactures, such as Ford Motor Co., allow users to select products and features from the product offered by the manufacture. Internet sites, such as ActiveBuyersGuide.com's, CompareItAll.com's, and Point.com's, provide automated selection tools that guide a user to products based on user provided criteria. Vendors pay ActiveBuyersGuide.com and Point.com as a function of monthly banner advertisement and licensing fees.

An automated selection tool can be programmed in conventional computer languages, such as C, C++, or JAVA. Artificial intelligence (AI) techniques, such as an expert system can be used. Applications using AI techniques, other than neural networks, tend to handle only conditions that the applications were preprogrammed to handle. For example, a rule-based expert system includes a set of rules and scenarios defined by a human expert. This limits the expert system to responding to only the situations contemplated by the expert at the time the expert system was developed.

Neural networks may used in automated selection tools because neural networks have the ability to infer new behavior based on past experience. Neural networks perform better at matching new situations based on past experiences than traditional programs that follow a chain of logical statements. Neural networks examine inputs concurrently rather than following a path through a chain of logical statements. Neural networks that use self organizing maps (SOM) are described in detail in U.S. Pat. No. 5,920,852 to Graupe, which is incorporated herein by reference.

SUMMARY

By way of introduction only, a computer network-based system and method of selecting preferred products includes using a neural network-based decision engine to automatically generate queries and select preferred products as a function of responses to the queries.

The foregoing discussion has been provided only by way of introduction. Nothing in this section should be taken as a limitation on the following claims, which define the scope of the invention.

BRIEF DESCRIPTION OF SEVERAL VIEWS OF THE DRAWINGS

The present invention is illustrated by way of example and not limitation in the accompanying figures. In the figures, like reference numbers indicate identical or functionally similar elements. Additionally, the left-most digit(s) of a reference number identifies the figure in which the reference number first appears.

DETAILED DESCRIPTION

Results-based marketing matches potential customers and vendors by rewarding the provider of the decision engine only when potential customers become actual customers. The decision engine may be a computer program that receives customer inputs and provides a preferred product(s) or service(s). Such a system aligns the goals of the potential customer, the provider of the decision engine, and the vendor. The potential customer wishes to find the best product for the customer's need. The decision engine reduces the search costs and search time for the potential customer. Since the intelligent decision engine provider is rewarded by the vendor when the user performs an activity with the vendor, the decision engine provider has an incentive to provide customized, unbiased product information to the potential customer. The vendor pays the decision engine provider based on the user's actual activities with the vendor. The per-customer-cost of result-based marketing is substantially less than traditional advertising including Internet banner advertising and cost-per-click advertising. Therefore, the interests of the potential customer, the vendor, and the decision engine provider are properly aligned in a result-based marketing scheme. The customer is provided with the best vendor for the customer's needs and the vendor is provided with the best customers for the vendor's products.

Figure 1:
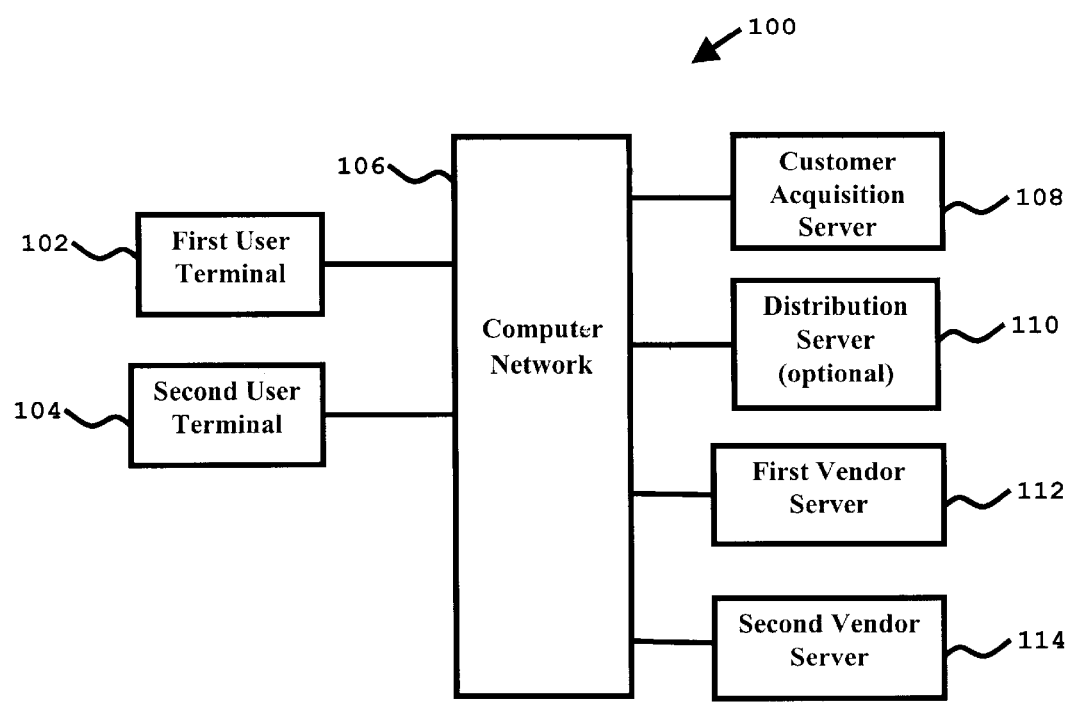
FIG. 1 illustrates a block diagram of a customer acquisition system.

FIG. 1 illustrates a customer acquisition system 100. The customer acquisition system 100 includes a computer network 106 interconnecting user terminals 102 and 104, a customer acquisition server 108, an optional distribution server 110, and various vendor servers 112 and 114. A neural network-based decision engine 202 in the customer acquisition server 108 may provides a flexible, scaleable, and reusable platform for selecting products as a function of responses to queries. The products may include banking services, brokerage services, credit services, and others.

The customer acquisition system 100 may be accessed by a potential customer to select a product or service from a variety of products or services based on the user's specific needs. The user terminal 102 used to access the customer acquisition server 108 may include a client browser, such as Internet Explore available from Microsoft, Netscape 6 available from Netscape, or another browser client or similar application. The term "product" includes physical products, financial products (financial instruments), services (banking; brokerage; credit card), and combinations thereof.

The potential customer accesses the customer acquisition server 108 via the user terminal 102 over the computer network 106. The customer acquisition server 108 interactively presents a variety of questions, queries, choices, scenarios, and other selections to the customer. Subsequent queries may be dependent on the potential customer's earlier response(s). The customer acquisition server 108 then presents the customer with one or more preferred products or services. The user may access the customer acquisition server 108 free of charge; after logging into the customer acquisition server 108, or after paying a fee.

The following example illustrates an embodiment of the customer acquisition system 100 used in a particular application. A user at the first user terminal 102 wishes open a bank account. The user accesses the customer acquisition server 108 over the computer network 106. The customer acquisition server 108 presents various questions to the user. The questions may include such questions as:

1. What city do you live in? or Where in the city do you live?
2. What city do you work in? or Where in the city do you work?
3. Do you require a convenient bank branch near both your home and your office?
4. (If question 3 is answered in the negative then question 4 is asked) Is it more important to have a convenient bank branch near home or your office?
5. Do you use banking services other than checking and saving accounts?
6. Rank the following banking services from the most important to the least important: A. free check printing, B. drive up teller windows, C. extended lobby hours; D. on-line banking; and E. low ATM fees.
7. (The options presented in this questions are based on multiple preceding questions) Which would you prefer: A. a branch office near you home without a drive-up teller window or B. a branch office near your office that also offered on-line banking services?
8. Rank the following banks (1 being the most unfavorable and 10 being most favorable, select zero if you have no opinion)
ABC Bank__
MNO Bank and Trust__
XYZ Bank and loan__

The user is then presented a list of banks that best suit the responses. For example, three banks may be presented in ranked order, such as, ABC Bank, DEF Bank, and MNO Bank and Trust. The user may be presented with the opportunity to receive detailed information about each bank by selecting a hyper-link. The user may be presented with the opportunity to open an account at the preferred banks. The user may disregard the preferred banks and choose to receive information about a different bank and optionally open an account at the non-preferred bank. Once the user performs an activity with a bank, the bank pays a fee to the owner or operator of the customer acquisition server 108.

While the above example illustrates a user receiving information about banking services via the customer acquisition system 100, numerous other products and services can also be provided. In other embodiments of the customer acquisition system 100, potential buyers are matched with vendors in the brokerage, insurance, mortgage, consumer products, utility services, telecommunications services, industrial commodities, and credit card industries.

Optionally, the customer acquisition server 108 may be hosted on a distribution server 110. The distribution server 110 may be an Internet portal, search engine, vendor site or other network site. The customer acquisition server 108 and the distribution server 110 may be physically different computers or may be a single computer performing both functions. The operator of the distribution server 110 may offer access to the customer acquisition server 108 to increase the services provided to distribution server's 110 users and to add an additional revenue source to the distribution server's 110 traditional revenue sources.

Revenues may be generated from the operation of the customer acquisition server 108 in a variety of manners, including banner advertising fees, periodic fee, performance-based fees, result-based fees and other fees and charges. Result-based fees include fees paid be a vendor as a function of the user's activities with the vendor. For example, if a user accesses the customer acquisition server 108 via the distribution server 110 and subsequently opens an account with the vendor, the vendor would then pay a fee to the operator of the customer acquisition server 108 and/or the distribution server 110. The result-based fee may be in addition to other fees, such as banner advertising fees or licensing fees. The vendor may determine that a user was referred to the vendor by the customer acquisition server 108 by one or more of a variety of methods. For example, the customer acquisition server 108 may cause a "cookie" to be created on the user's computer. The cookie may keep track of information about the user's Internet activities including the fact that the customer acquisition server 108 referred the user to the vendor. Such a cookie may expire, for example after 60 or 90 days. Other methods of tracking the user may also be used. For example, the user may be given a user ID to access the vendor server 112; the customer acquisition server 108 may be directed the user to the vendor server 112 and send a notice to the vendor server 112 indicating the user came from the customer acquisition server 108, the user may be directed to a predetermined web page of the vendor; and the customer acquisition server 108 may track the user and periodic check with the vendor to determine the user's activities. Such a notice need not reach the vendor server 112 substantially simultaneously with the user's access to the vendor server 112. Other methods of indicating the user was referred from the customer acquisition server 108 are also appropriate.

Figure 2:
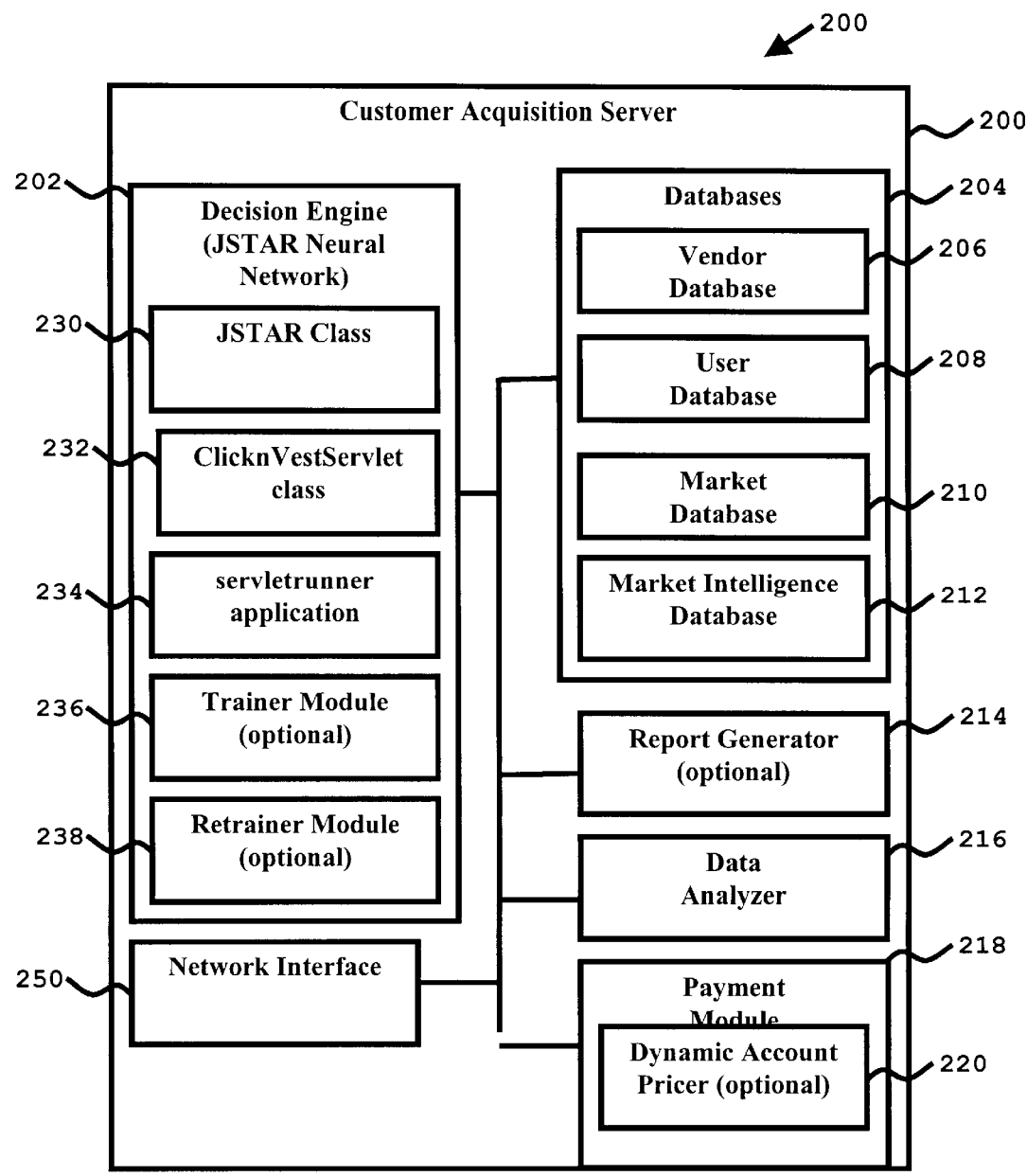
FIG. 2 illustrates a block diagram of a customer acquisition server.

FIG. 2 illustrates a block diagram of a customer acquisition server 200, also called a Customer Acquisition Management System. The customer acquisition server 100 (FIG. 1) may include some or all of the features of the customer acquisition server 200. The customer acquisition server 200 may include one or more of the following: a network interface 250, a decision engine 202, databases 204, a report generator 214, a data analyzer 216, and a payment module 218.

The network interface 250 connects the customer acquisition server 200 to a network, preferably a computer network 106 (FIG. 1), such as the Internet. The network interface 250 may also connect with networks such as television networks, telephone networks, satellite networks, local area networks, and other networks.

The decision engine 202 provides the user (potential customer) an interactive interface to select product or services. Decision wizards, comparative product charts, and other tools may be used in the interactive interface. The decision engine 202 also may provide information about the various product or services. The decision engine 202 may present a series of questions to the user about the features of the product or service as described above in reference to the customer acquisition server 100. Predictive networks and artificial intelligence may be used in the decision engine 202.

The decision engine 202 may include neural network-based algorithms that are effective in several applications including: diagnosis or pattern recognition, e.g. speech and image processing, because the neural network algorithm is capable of adjusting to patterns in data. Neural networks can deduce relationships between the different data variables, e.g. estimation or prediction applications even when difficulties exist in completely specifying the rules for a model. Neural networks can assess interrelationships between the factors and predict outcomes with significant accuracy. A neural network may be capable of processing large amounts of data in real-time. Once the training set for the neural network is developed, the learning algorithm trains the neural network by creating a network of associations between possible aspects of input and response. A neural network is more flexible than traditional programming methods because the neural network can be scaled and can be reused for other problem domains.

The decision engine 202 may include some of the following components: 1. a Java storage and retrieval (JSTAR) Class 230; 2. a ClicknVestServlet class 232; 3. a servletrunner application 234; 4. a Trainer Module 236; and 5. a Retrainer Module 238. While FIG. 2 illustrates a decision engine 202 implemented in part in the Java computer language, other languages may also be used.

The decision engine 202 may be executed on a Microsoft Windows 95®-based personal computer or other Java compatible platform, including a Microsoft NT® server, a Sun Station®, an IBM RS/6000®, or other platform. The decision engine 202 may be incorporated into a kiosk system.

The decision engine 202 may be implemented for online brokerage, credit card, banking, and other applications. The decision engine 202 may make recommendation with various user survey (queries) values. Because the permutations of user inputs may be large, traditional programming with logical statements would be tedious. The neural network-based decision engine 202 is more appropriate than other traditional approaches, such as conventional linear programming, expert systems, and relational databases. The superior decision-making of the decision engine 202 results in part from the following factors:

1. Inference of new behavior;
2. Deduction of patterns and relationships within data;
3. Simplicity of algorithm; and
4. Flexibility of algorithm The decision engine 202 can recognize patterns and relationships within a set of input data (responses) and estimate and/or predict outcomes. The decision engine 202 may also process a large number of variables (queries and responses) and be able to deduce the interactions between the different variables. The relationships between numerous variables may be difficult to formally define, particularly when the relationships are non-linear. The decision engine 202 may be trained to handle the numerous variables and can self-adapt and sort through data to produce an understanding of the factors affecting the data. Such training is described below in relation to 302 of FIG. 3.

The decision engine 202 may incorporate a scalable, robust, customizable, quick, simplicity, flexibility, and efficient architecture for large scale memory, retrieval, and classification problems. The decision engine 202 is scaleable by adding more self organizing maps (SOMs) and the associates variables to the training set and re-training the neural network. Unlike traditional programming techniques, the decision engine's programming code need not be changed. With re-training, the decision engine 202 provides greater flexible without reprogramming. The decision engine 202 can infer new behavior and deduce patterns and relationships in the data. The decision engine 202 includes two Java classes: the JSTAR class 210 and the ClicknVestServlet class 232.

The JSTAR Class 230 is a Java class that is also called a JSTAR Java servlet. The JSTAR class 230 is an object-oriented, Java language based application.

The JSTAR class 210 may contain several class variables and methods used to configure, activate, and maintain the decision engine 202. The JSTAR class 210 may include the variables of Table 1 and the methods of Table 2.

TABLE 1

JSTAR CLASS VARIABLES

| VARIABLE NAME | VARIABLE DESCRIPTION |
| --- | --- |
| num_sub_words | Number of sub-words in the input word |
| num_elem_sub_word | Number of elements per sub-word |
| max_patterns_per_som | Maximum Number of patterns that can be stored per SOM |
| learn_coeff | Learning coefficient used in punishing/rewarding weights |
| max_link_value | Maximum value used for correlation links |
| min_link_value | Minimum value used for correlation links |
| som_error_thresh | Error threshold used in selecting the winning neuron in a SOM |
| forget_thresh | Forget threshold used in calculating "forgetting" of links |
| decay_coeff | Decay coefficient used in natural decay of links |
| som_weights | Array which stores different patterns in SOM's |
| correl_links | Correlation link array |

TABLE 1-continued

JSTAR CLASS VARIABLES

| VARIABLE NAME | VARIABLE DESCRIPTION |
|---|---|
| winning_neurons | Array to store winning neurons per SOM for an input word |
| subword_select_weights | Weight array used for selecting which subword to begin searching |
| short_term_memory | Short term memory array |

TABLE 2

JSTAR CLASS METHODS

| METHOD NAMES | DESCRIPTION |
|---|---|
| readInputWord() | Method to read a training input word from a file |
| storeInputWord() | Method to store a training input word into the appropriate SOM's and create the correlation links |
| randomSelectSOM() | Method to randomly select the first sub-word to search during a retrieval |
| findWinningNeuron() | Method to find the winning neuron in a SOM during retrieval |
| findCorrelLinks() | Method to find the strongest correlation link from a particular neuron during retrieval |
| acceptOutput() | Method to determine whether a retrieved input word should be accepted or thrown out |
| PunishInputWeights() | Method to punish the input weights into a SOM |
| RewardInputWeights() | Method to reward the input weights into a SOM |
| punishCorrelLinks() | Method to punish the correlation links of a retrieved word |
| rewardCorrelLinks() | Method to reward the correlation links of a retrieved word |
| timeDecayCorrelLinks() | Method to time decay the correlation links of a retrieved word |
| findOutputNeuron() | Method to determine which output layer to select for a retrieved word |
| retrieve() | Main method to coordinate retrieval of an input word |
| store() | Main method to coordinate storing of an input word |

The ClicknVestServlet class 232 is a Java class that implements the Java servlet functionality and interfaces with the web server. The ClicknVestServlet class 232 may include the variables of Table 3 and the methods of Table 4.

TABLE 3

CLICKNVESTSERVLET CLASS VARIABLES

| VARIABLES NAMES | DESCRIPTION |
|---|---|
| JSTAR | JSTAR class variable created upon activation of the Servlet |
| lam_dir | Directory where configuration files for JSTAR are located |

TABLE 4

CLICKNVESTSERVLET CLASS METHODS

| METHODS NAMES | DESCRIPTION |
|---|---|
| init() | Method which is called to create (initialize) the ClicknVestServlet servlet |

TABLE 4-continued

CLICKNVESTSERVLET CLASS METHODS

| METHODS NAMES | DESCRIPTION |
|---|---|
| doPost() | Method which is called when a POST message (HTTP) is received at the web server. This method processes the message and responds back to the client. |

The servletrunner application 234 handles the interaction between web servers and the ClicknVestServlet class 232. The servletrunner application 234 may be the Servletrunner, available from Sun Microsystems in the Java Servlet Software Development Kit (SDK). The servletrunner application 234 may be run locally to simulate a servlet compatible web server.

The trainer module 236 trains the neural network. Training of the neural network is described below in reference to 302 of FIG. 3. The optional trainer module 236 may be an integral component of the decision engine 202 or it may be a separate component. The decision engine 202 may also be trained without a training module 236.

The optional re-trainer module 238 may use the queries, responses, confidence values and/or other factors to fine tune the decision engine 202. Re-training of the decision engine 202 is discussed below in relation to 320 of FIG. 3. The re-trainer module 238 may be an integral component of the decision engine 202 or it may be a separate component.

The databases 204 may include vendor data, market data, and buyer data. The databases 204 may be partitioned into one or more databases, such as a vendor database 206, a user database 208, a market database 210, and a market intelligence database 212. The vendor database 206 may include information about the vendor, the products that the vendor carries, vendor specific pricing and options, and the vendor's Internet site address. The vendor database 206 may also include detailed information about the products and services offered, including price, features, brand names, delivery methods (including on-line, store front, or via distributors), availability dates, and other information.

The user database 208 may include information collected about the users. For example, the user database 208 may include information about the user such as age, income level, gender, address (home and/or office), and planned purchase timeframe. After the user has used the customer acquisition server 200 to compare products or services, the user database 208 may include the user's preferences entered in the selection process and the user's down-selected list. The preferences of multiple users may be used to develop trend information that is stored in the market intelligence database 212. For example, the trend information may show that 80% of users want on-line banking, 50% of users want interest bearing checking accounts, and 2% of users want their photograph on their checks. Another example of trend information may be that 80% of users that match 100% of the search criteria open an account at a preferred vendor. After the user has purchased a product or service via the customer acquisition server 200, the user database 208 may include information about the user's prior purchases. The user database 208 may also contain other user information such as the user's purchasing preferences obtained from other sources.

The market database 210 may include information about trends in the market place. For example, the market database 210 may include information about a trend among banking customers for more on-line banking and ATM banking features and less in-bank services. The market intelligence database (MID) 212 may include syndication, distribution and licensing of buyer data, vendor data, product data, and market data. Data mining techniques may be used on the data in the MID 212 to develop market trend data, competitive analysis, vendor profiles, and customer profiles.

The optional report generator 214 provides reports including vendor reports that indicate activities between users and vendors, user reports that indicate user activities with the customer acquisition server 200 and/or the vendors, preference reports that indicate trends in customer preferences, ad hoc reports, and others.

The optional data analyzer 216 may provide customizable data analysis tools. For example, the data analyzer 216 may provide customized or ad hoc data analysis that the distribution server 110 (FIG. 1) or the vendor server 112 can use to fine tune the marketing of the product or services.

The payment module 218 calculates the fees charged to the vendors. Such fees may include periodic fees, banner fees, performance-based fees, and results-based fees. The results-based fees include fees based on the activities between users and vendors, when the users are referred to the vendor by the customer acquisition server 200. A user is referred to a vendor when the customer acquisition server 200 provides the user information about a vendor or a product or service offered by the vendor. User activities may include accessing the vendor's network site, opening a new account with the vendor, purchasing a product, or other activity. The fees may include fees charged to vendors other than the user's preferred vendors when the user opens an account with the non-preferred vendor. The non-preferred vendor fee may be less than the preferred vendor fee. The amount of the fee may be based on various factors, for example, the number of activities the user performed prior, the user's profile, or the type of activity.

The payment module 218 may also calculate fees between the owner or operator of the distribution server 110 and the owner or operator of the customer acquisition server 108. Such fees may include one-time or periodic licensing fees, per transaction fees, fee sharing arrangements, and other fees. For example, the customer acquisition server 108 owner may receive a fee from the various vendors for each account open by users of the customer acquisition server 108 and share a percentage of the fee with the distribution server 110 owner.

The payment module 218 may include an optional dynamic account pricer (DAP) 220. The DAP 220 dynamically determines a price for a user's activity at a vendor's site as a function of user's activities. For example, a bank pays a first price when a user opens an account with an opening balance of $1,000 and the bank pays a second price (usually higher than the first price) when a user who opens an account with an opening balance of $25,000. In other examples, the DAP 220 determines the price as a function of one or more factors including: user's income level, user's past activities, user's selection criteria, the user's profile, the number and/or types of activities the user has done during a period of time, the number of users that perform an activity with the vendor during period of time, vendor's profile, market conditions, sales, discounts, or other criteria including combinations thereof. The fee may also be a function of a percentage of the user's transaction(s), a flat fee, or other fees.

Xolia's DecisionMaker, available at www.xolia.com, implements some of the features of the customer acquisition server 200. Internet-based brokerages, banks, and credit card companies and portals currently use Xolia's DecisionMaker. While the above discussion of the customer acquisition server 200 focuses on financial Internet-based products and services, the customer acquisition server 200 may be used in a variety of business lines, such as credit cards, consumer products, restaurants, travel agencies, Internet service providers, telephone service companies, insurance, telecommunications, healthcare, automotive, education, and others.

Figure 3:
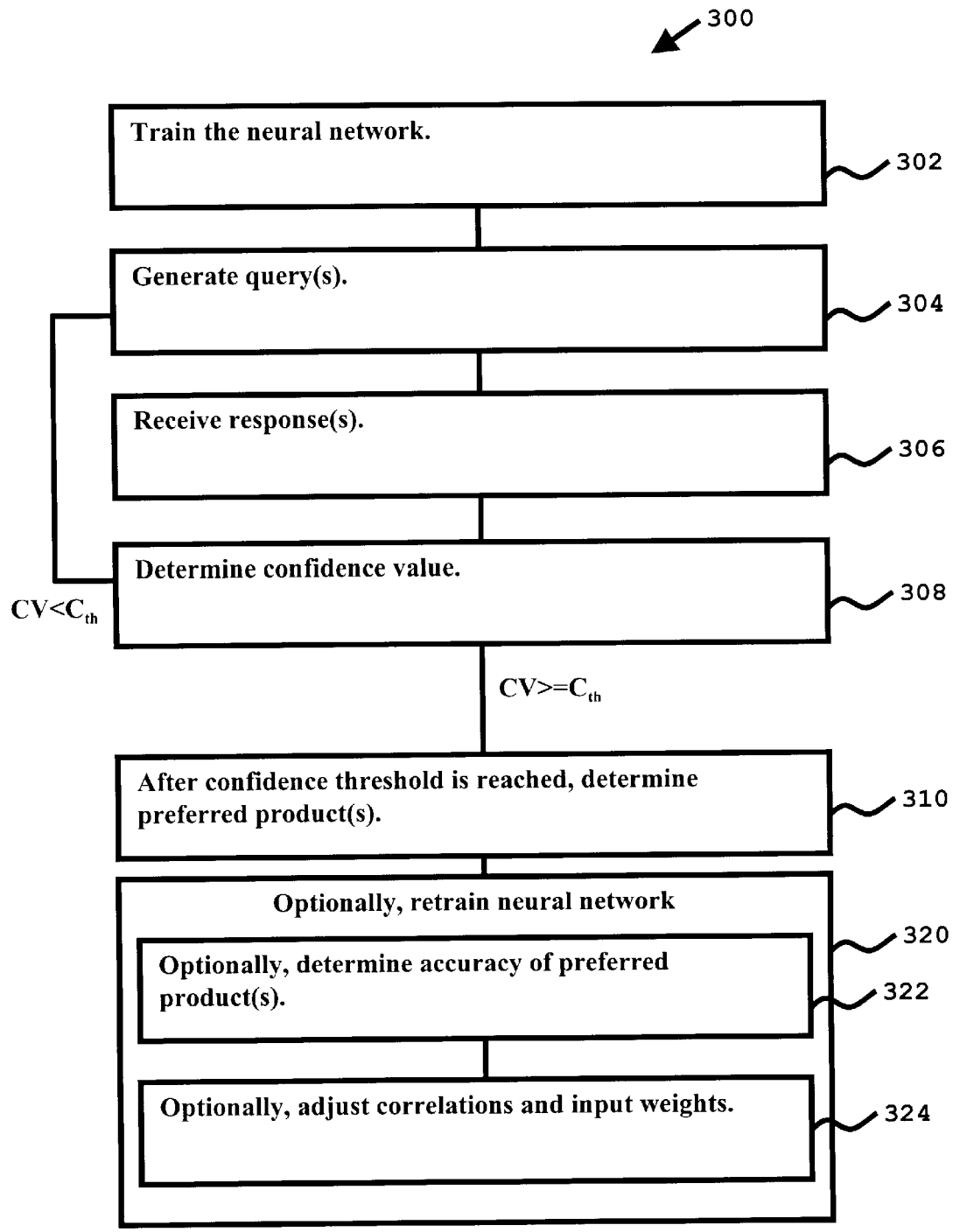
FIG. 3 illustrates a flow diagram of a method of operation of the customer acquisition server.

FIG. 3 illustrates a flow diagram of a method 300 of operation of the customer acquisition server 200 (FIG. 2). The method 300 may include some or all of the following in various orders of executions: training the neural network 302; generating queries 304; receiving responses 306; determining confidence values 308; determining preferred product(s) 310; and retraining the neural network 320.

In 302, the neural network is trained. Proper and adequate training of the neural network is vital to the accuracy of the neural network. The following examples of training the neural network illustrates the iterative process of training a neural network for use in a customer acquisition server 200 (FIG. 2).

The learning algorithm for a neural network is the same regardless of the application of the neural network. The training data that teaches the neural network changes as a function of the application. Thus, the same neural network can be used for a medical diagnosis application and an automobile diagnosis application. The developer would only have to create new training data sets for each application. Instead of having to redevelop the whole application, only training data would need to be created. A neural networks is only as good as the training data it is fed.

The following example of training the decision engine 202 (FIG. 2) using 16 training words illustrates some appropriate the training techniques. Four training words may be used for each type of prospective banking customers. The prospective online brokerage customers may be divided into four types: 1. one-stop shopper investors, 2. life goal planners, 3. serious investors, and 4. hyper-traders. The training words may include a sub-word for each question on the survey, for example 12 sub-words for a 12 question survey. The decision engine 202 may use the following configuration parameters:

Maximum number of patterns stored in SOM=20

Learning coefficient for input and correlation weights=0.1

Maximum link value for correlation links=2

Minimum link value for correlation links=0.1

SOM error threshold=0.02

Forget threshold=0.2

Decay coefficient=0.04

After the 16 training words are stored in the decision engine 202, the 16 test input words may be input into the neural network. Then the results may be gathered. The results indicate whether the decision engine's conclusion was the same as the expected value from the test data for each test input word. An example of the training is illustrated in Table 5.

TABLE 5

FIRST TEST RUN RESULTS

|  | JSTAR Conclusion | Expected Result |
| --- | --- | --- |
| Test Word 1 | One-stop shopper | One-stop shopper |
| Test Word 2 | One-stop shopper | One-stop shopper |

TABLE 5-continued

FIRST TEST RUN RESULTS

|  | JSTAR Conclusion | Expected Result |
|---|---|---|
| Test Word 3 | One-stop shopper | One-stop shopper |
| Test Word 4 | Serious Investor | One-stop shopper |
| Test Word 5 | Life goal planner | Life goal planner |
| Test Word 6 | Life goal planner | Life goal planner |
| Test Word 7 | Life goal planner | Life goal planner |
| Test Word 8 | Life goal planner | Life goal planner |
| Test Word 9 | Serious Investor | Serious Investor |
| Test Word 10 | One-stop shopper | Serious Investor |
| Test Word 11 | Hyper-Trader | Serious Investor |
| Test Word 12 | Hyper-Trader | Serious Investor |
| Test Word 13 | Hyper-Trader | Hyper-Trader |
| Test Word 14 | Hyper-Trader | Hyper-Trader |
| Test Word 15 | Serious Investor | Hyper-Trader |
| Test Word 16 | Hyper-Trader | Hyper-Trader |

The results in Table 5 indicate that the decision engine 202 reached the correct solution 75% (12 of 16) of the times.

After analyzing the correlation link values in the decision engine 202, two of the questions may lead to the same answer regardless of the type of investor. This resulted in the decision engine 202 occasionally converging to an incorrect output layer node. For example, a question relating to the percentage of investing done for long term and short term growth may be receive the same answer from a one-stop shopper and a life goal shopper. A second test can be conducted to determine if such "irrelevant" questions (questions answered the same by different investor types) caused the decision engine 202 to reach an incorrect conclusions.

The second test retrained the decision engine 202 with only 10 sub-words (questions) per input word because two irrelevant questions were eliminated. Table 6 below shows the results of the second test.

TABLE 6

SECOND TEST RUN RESULTS

|  | JSTAR Conclusion | Expected Result |
|---|---|---|
| Test Word 1 | One-stop shopper | One-stop shopper |
| Test Word 2 | One-stop shopper | One-stop shopper |
| Test Word 3 | One-stop shopper | One-stop shopper |
| Test Word 4 | Serious Investor | One-stop shopper |
| Test Word 5 | Life goal planner | Life goal planner |
| Test Word 6 | Life goal planner | Life goal planner |
| Test Word 7 | Life goal planner | Life goal planner |
| Test Word 8 | Life goal planner | Life goal planner |
| Test Word 9 | Serious Investor | Serious Investor |
| Test Word 10 | One-stop shopper | Serious Investor |
| Test Word 11 | Serious Investor | Serious Investor |
| Test Word 12 | Hyper-Trader | Serious Investor |
| Test Word 13 | Hyper-Trader | Hyper-Trader |
| Test Word 14 | Hyper-Trader | Hyper-Trader |
| Test Word 15 | Serious Investor | Hyper-Trader |
| Test Word 16 | Hyper-Trader | Hyper-Trader |

As indicated in Table 6, removing two questions from the original survey resulted in 11 correct answers, one more than the first test. Therefore, other factors must have caused the remaining wrong answers.

To determine the other factors, different training input words may be used. There may be a fine line between the values of the different sub-words for different investor category. For example, training input words for the hyper-trader category may be substantially similar to the training input words for the serious investor category. Thus, in a case where a user's input data fell somewhere in between these two ranges of training input words, the conclusion of the decision engine 202 could oscillate between the two categories.

The oscillation may be removed in several ways, for example: 1. increase the number of categories; 2. increase the number of training words; 3. increase the number of questions (sub-words) in the survey; and 4. remove or modify questions in the survey which seem to have the same value for different categories.

In 304, queries are generated. The queries (sub-words) may be generated one at a time, in groups or all the queries for a survey may be generated at one time. The query generation process may include using previous queries and responses to determine a subsequent query or queries. The queries may be presented to the user terminal over the Internet 106.

For example, some of the queries relating to a on-line brokerage selection may be:

1. What is your typical trading frequency? 1. Frequent (every day); 2. Consistent (every week); 3. Regular (every month); or 4. Infrequent (less than every month).
2. Which of the following investment research techniques to you use? 1. Tips from friends, message boards, and instinct; 2. in-depth traditional research, charts, and technical analysis; and 3. Mutual fund finders.
3. What is your invest strategy? 1. Daily growth (highest risk); 2. Aggressive growth (high risk); 3. income/growth (low risk); or 4. Life goal planner (lowest risk).
4. Which stock markets do plan to trade on: 1. NYSE and AMEX (U.S. Listed stocks); 2. NASDAQ (U.S. non-listed); 3. Over-the-counter (U.S. non-listed); 4. Foreign stock exchanges; 5. U.S.-based commodity exchanges; 6. U.S.-based future exchanges; and 7. U.S.-based option exchanges.
5. Rank the on-line brokerage features in order of importance to you: 1. Comprehensive service plan; 2. Ease of use; 3. Fastest execution of trades; 4. Highest quality research; 5. Low cost trading; 6. Portfolio planning and tracking tools; and 7. Stable reputation of brokerage.
6. What type of brokerage account do you use: 1. Cash; 2. Margin; and 3. retirement (IRA).
7. What is you estimated initial deposit? 1. >$15,000; 2. >$10,000; 3. >$5,000; 4. >$2,000; 5. >1,000; 6. 1,000 or less.
8. What trading methods do you want? 1. Touch tone; 2. online; 3. broker assisted; and 4. wireless.
9. What type of quotes do you want? 1. real-time (free unlimited); 2. real-time (free limited); 3. real-time (pay); 4. streaming; 5. NASDAQ Level II; and 6. delayed.
10. What software do you want the brokerage to be compatible with? 1. MS Money; 2. Quicken; 3. None
11. What additional services do you want? 1. IPOs; 2. After hours trading; 3. Check writing; 4. ATM card; 5. Asset management; and 6. Active trader benefits.

In 306, responses to the queries are received. The queries may be presented to the user one at a time or in a group(s). Likewise, the responses may be received one at a time or in a group(s). The responses may be stored in the user database 208 (FIG. 2). The user may respond to the queries from a user terminal 102 (FIG. 1) over the Internet 106. The user may respond to some queries and not respond to others.

Stochastic modulation or other variation schemes may be used to randomize the order or the type of queries presented. The stochastic modulation prevents the neural network from becoming "rigid" and allows the neural network to continuously be retrained.

In 308, a confidence value is determined. A confidence value may be calculated after each response is received, after a group of responses is received, randomly, after a number of responses has been received, or using another method. When the confidence value reaches or exceeds a confidence threshold, the customer acquisition server 200 (FIG. 2) determines the preferred product(s) as a function of the responses already received and may ignore the remaining responses. The customer acquisition server 200 may be capable of generating a large number of queries and use a small subset of the queries to determine the preferred product(s). By evaluating the confidence value, the customer acquisition server 200 may determine preferred product(s) with fewer queries than traditional methods. The confidence threshold may be user programmable, fixed or dynamically based on various factors. For example, the confidence threshold may be 50%, 75%, 90%, 95%, 97%, 99.9% or another value.

In 310 a preferred product or products is determined. The preferred product(s) may be determined by identifying the strongest link to the output layer in the neural network. By analyzing the responses, the customer acquisition server 200 determines the products or products that best match the user's needs and desires. If the user responded to less than all the queries, a preferred product may be determined with only the subset of responses. The preferred product may include services offered by various vendors, such as brokerage service plans. Alternatively, the preferred product may include a preferred vendor, such as a brokerage.

In 312, the neural network is optionally retrained. The retraining may include determining the accuracy of the preferred product(s) 322 and adjusting the correlations and/or weights 324. The accuracy may be determined 322 in a variety of manners, for example, 1. by an additional query or queries may be generated that seek to determine the accuracy of the preferred products from the user; 2. by evaluating the user's activities after the preferred product(s) are determine, e.g. accessing a network site for a preferred product, opening an account, or re-accessing the customer acquisition server using different response; and 3. by vendor feedback, e.g. feedback relating to the users referred to the vendor by the customer acquisition server 200 (FIG. 2). The adjusting 324 may be a function of one or more of the following factors: the queries generated, responses received, the confidence value(s); the accuracy of the preferred product(s); and others.

The decision engine 202 may be retrained once a preferred product is determined, a queries can be generated that asks the user accept or deny the preferred product. If the user accepts the preferred product, the decision engine 202 may increase correlations and input weights associated with those preferred products. If the preferred product is denied, the correlations and input weights are reduced. Optionally, time correlation and forget mechanisms can be used to periodically retrain the decision engine 202. Time correlation includes monitoring the length on time a user takes to provide a response to a query. Another aspect of time correlation includes 1. detecting trends over time, e.g. as the baby boomer population ages the average investment strategy of the entire population will change; 2. detecting periodic trends, e.g. seasonal trends like less investment near the year end or tax related investment reallocation near the year end; and 3. detecting short term trends, e.g. intense investment activities in a particular market sector.

The neural network-based decision engine 202 selects a preferred product(s) based on limited user input by determining a confidence level after receiving some input from the user. Such a decision engine 202 reduces the required user responses and makes the selection processes easier for the user without sacrificing accuracy. The accuracy of the decision may be controlled by adjusting the confidence threshold. The confidence level may be determined after processing the user responses to some of the queries. By reducing the required user input, more users are likely to complete the selection process and ultimate act on the recommendation from the decision engine 202. The attention span of users may be rather short, especially for PDA or cell phone-based users, therefore faster recommendations are highly desirable.

While a particular embodiment of the present invention has been shown and described, modifications may be made. It is therefore intended in the appended claims to cover all such changes and modifications which follow in the spirit and scope of the invention.

What is claimed is:

1. A method of selecting a preferred product from a list that includes a plurality of products, the method comprising:
(a) presenting a sequence of queries to a user, the user responding to each query in sequence with a corresponding response;
(b) in response to a user response to a query in the sequence, using a neural network to delete at least one product from the list to provide an updated list;
(c) in the event that the user does not select a preferred product from the updated list, continuing with the presentation of the sequence of queries to the user; and
(d) repeating steps (b) and (c) until the user selects a preferred product.

2. A method of selecting a preferred from a list that includes a plurality of products, the method comprising:
(a) providing a first query to a user;
(b) in response to a user response to the first query, using a neural network to delete at least one product from the list to provide an updated list;
(c) in the event that the user does not select a preferred product from the updated list, presenting a new query to the user and, in response to a user response to the new query, deleting at least one additional product from the updated list to provide a new updated list; and
(d) repeating item (c) until the user selects a preferred product.

3. The method of claim 2, and wherein the products are selected from a group consisting of banking services, mortgage services, brokerage services, credit card services, insurance services, telecommunications services, and combinations thereof.

4. The method of claim 2, and wherein the products comprise services.

5. The method of claim 2, and wherein the queries are presented to the user via a network based browser.

6. A customer acquisition server that dynamically generates an updated list of products from an original list of a plurality of products, comprising:
a neural network-based decision engine that iteratively responds to user responses to a sequence of queries provided to a user by, upon receipt of a user response to a query, deleting at least one product from a current list of products to provide the updated list of products until the user selects a preferred product from the list of products.

7. The method of claim 4, and wherein the services include stock brokerage services.

8. The method of claim 4, and wherein the services include banking services.

9. The method of claim 4, and wherein the services include insurance services.

10. The method of claim 5, and wherein the network is an internet network.

11. The method of claim 5, and wherein the network is an intranet network.

12. A customer acquisition server, comprising:
a neural network based decision engine that automatically generates a sequence of a plurality of queries and selects a preferred product as a function of responses to the queries,
wherein the decision engine generates subsequent queries as a function of a response to a previous query,
and wherein the decision engine selects the preferred product as a function of a number of response that is less than or equal to the plurality of queries.

13. The server of claim 12, and further comprising:
a database operatively connected to the decision engine, wherein the database stores the queries and query correlations.

14. The server of claim 12, and wherein the decision engine calculates a confidence level after receiving a response and wherein the decision engine selects a preferred product as a function of the responses received before the confidence level exceeds a confidence threshold.

15. The server of claim 14, and wherein the decision engine determines a confidence level after receiving each response.

16. The server of claim 12, and wherein the queries include an investor type query that classifies a user by the user's investing preferences.

17. The server of claim 16, and wherein the investing preferences is selected from a group consisting of life goal planner, serious investor, hyperactive investor, one-stop shopper, short-term trader, long-term investor, futures trader, options trader, and combinations thereof.

18. The server of claim 12, and wherein the queries include a banking type query that classifies a user by the user's banking preferences.

19. The server of claim 12, and wherein the queries include an insurance type query that classifies a user by the user's insurance preferences.

20. A customer acquisition server, comprising:
a neural network based decision engine that automatically generates queries and selects a preferred product as a function of responses to the queries,
wherein the decision engine generates first and second queries, where the second query is a function of a response to the first query,
and wherein the decision engine comprises a plurality of self organizing maps comprising a plurality of memory locations for storing subwords, wherein the memory locations comprises a corresponding link weight,
and wherein the decision engine compares a response to a subset of the subwords.

21. The server of claim 20, and further comprising:
a training module for training the decision engine.

22. The server of claim 21, and wherein the training module allows iterative training of the decision engine.

23. The server of claim 20, and wherein the decision engine generates the queries using stochastic modulation.

24. The server of claim 20, and further comprising:
a retraining module that adjusts links between memory locations as a function of a response.

25. The server of claim 24, and wherein the response being responsive to a query relating to the accuracy of the neural network in selecting the preferred product.

26. The server of claim 14, and further comprising:
a retraining module that adjusts a correlation as a function of a response.

27. The server of claim 26, and wherein the retraining module adjusts a correlation as a function of an activity with the preferred product.

28. The server of claim 26, and wherein the retraining module adjusts a correlation as a function of vendor input.

29. The server of claim 28, and wherein the vendor is a vendor of stock brokerage services.

30. The server of claim 28, and wherein the vendor is a vendor of banking services.

31. The server of claim 28, and wherein the vendor is a vendor of insurance services.

32. A method of automatically selecting a preferred product from a list of products, the method comprising:
generating a plurality of queries, and
automatically selecting a preferred product from the list of products using a neural network decision engine to analyze responses to the queries,
wherein the decision engine automatically generates first and second queries, where the second query is a function of a response to the first query,
and wherein the decision engine selects the preferred product is a function of fewer responses than the plurality of queries.

33. The method of claim 32, and further comprising:
presenting the queries to a user via a network based browser.

34. The method of claim 33, and wherein the network is an internet network.

35. The method of claim 33, and wherein the network is an intranet network.

36. The method of claim 32, and wherein the step of generating queries comprises generating queries using stochastic modulation.

37. The method of claim 32, and wherein the step of generating queries comprises generating a retraining query and retraining the neural network as a function of a response to the retraining query.

38. The method of claim 32, and wherein the step of generating queries comprises generating a query with a set of response options, where the response options are a function of trend data.

39. The method of claim 38, and wherein the trend data includes stock-related trend data.

40. The method of claim 38, and wherein the trend data includes banking-related trend data.

41. The method of claim 38, and wherein the trend data includes insurance-related trend data.

42. The method of claim 38, and wherein the trend data comprises market trend data.

43. The method of claim 38, and wherein the trend data comprises user trend data.

44. The method of claim 32, and wherein the step of selecting a preferred product comprises selecting a preferred product as a function of a user profile that includes information submitted during a current user session.

45. The method of claim 44, and wherein the user profile includes information relating to responses from a user's prior selection process.

46. The method of claim 44, and wherein the user profile comprises information relating to responses from a user's prior activities with a vendor.

47. The method of claim 44, and further comprising:

generating a confidence level as a function of the responses, wherein the generating queries includes generating queries until the confidence level exceeds a confidence threshold.

48. The method of claim 32, and further comprising:

retraining the neural network.

49. The method of claim 48, and wherein the retraining the neural network comprises retraining the neural network as a function of the responses.

50. The method of claim 48, and wherein the retraining the neural network comprises retraining the neural network as a function of response trends.

51. The method of claim 48, and wherein the retraining the neural network comprises retraining the neural network as a function of market trends.

* * * * *